(12) United States Patent
Read et al.

(10) Patent No.: US 8,297,931 B2
(45) Date of Patent: Oct. 30, 2012

(54) ANNULUS FILLER

(75) Inventors: Simon Read, Derby (GB); Ewan F Thompson, Derby (GB); Christopher S Brown, Leicester (GB)

(73) Assignee: Rolls-Royce PLC, London (GB)

( * ) Notice: Subject to any disclaimer, the term of this patent is extended or adjusted under 35 U.S.C. 154(b) by 486 days.

(21) Appl. No.: 12/461,111

(22) Filed: Jul. 31, 2009

(65) Prior Publication Data

US 2010/0040472 A1    Feb. 18, 2010

(30) Foreign Application Priority Data

Aug. 13, 2008  (GB) .................................. 0814718.3

(51) Int. Cl.
*F01D 5/02* (2006.01)

(52) U.S. Cl. ................ 416/215; 416/219 R; 416/220 R; 416/221; 416/500

(58) Field of Classification Search .............. 416/193 A, 416/219 R, 220 R, 248, 190, 215, 221, 500
See application file for complete search history.

(56) References Cited

U.S. PATENT DOCUMENTS

| | | | | |
|---|---|---|---|---|
| 4,655,687 A | * | 4/1987 | Atkinson | 416/193 A |
| 5,161,949 A | * | 11/1992 | Brioude et al. | 416/193 A |
| 5,791,877 A | * | 8/1998 | Stenneler | 416/221 |
| 5,890,874 A | * | 4/1999 | Lambert et al. | 416/193 A |
| 6,514,045 B1 | * | 2/2003 | Barton et al. | 416/193 A |
| 6,726,452 B2 | * | 4/2004 | Strassberger et al. | 416/190 |
| 8,066,479 B2 | * | 11/2011 | El-Aini et al. | 416/1 |
| 2003/0012654 A1 | | 1/2003 | Strassberger et al. | |
| 2010/0040472 A1 | * | 2/2010 | Read et al. | 416/204 R |

FOREIGN PATENT DOCUMENTS

GB  2 171 151 A  8/1986
GB  2 186 639 A  8/1987

* cited by examiner

*Primary Examiner* — Igor Kershteyn
*Assistant Examiner* — Christopher R Legendre
(74) *Attorney, Agent, or Firm* — Oliff & Berridge, PLC

(57) ABSTRACT

An annulus filler (101) is provided for mounting to a rotor disc (102) of a gas turbine engine and for bridging the gap between two adjacent blades attached to the rotor disc (102). The annulus filler (101) has an outer part (106) which defines an airflow surface for air being drawn through the engine, and a separate, support part (105) which is connectable to the outer part (106) and to the rotor disc (102) to support the outer part (106) on the rotor disc (102). The outer (106) and support parts (105) are configured to allow a procedure for mounting the annulus filler (101) to the rotor disc (102). In a first step the support part (105) is connected to the rotor disc (102) without the outer part (106), and in a subsequent second step the outer part (106) is connected to the support part (105).

9 Claims, 3 Drawing Sheets

ANNULUS FILLER

The present invention relates to annulus fillers for bridging gaps between adjacent blades of a gas turbine engine stage.

Conventionally, a compressor rotor stage in a gas turbine engine comprises a plurality of radially extending blades mounted on a disc. The blades are mounted on the disc by inserting a root portion of the blade in a complementary retention groove in the outer face of the disc periphery. To ensure a radially smooth inner surface for air to flow over as it passes through the stage, annulus fillers can be used to bridge the spaces between adjacent blades. Typically, a seal between the annulus fillers and the adjacent fan blades is also provided by resilient strips bonded to the annulus fillers adjacent the fan blades.

Annulus fillers of this type are commonly used in the fan stage of gas turbine engines. The fillers may be manufactured from relatively lightweight materials and, in the event of damage, may be replaced independently of the blades.

It is known to provide annulus fillers with features for removably attaching them to the rotor disc. An annulus filler may be provided with a hook member at its axially rear end, the hook member sliding into engagement with part of the rotor disc and/or a component located axially behind the rotor assembly, for example a rear fan air seal. Typically, such an annulus filler is slid axially backwards over the rotor disc following an arc which matches the chord-wise curvatures of the aerofoil surfaces of the adjacent blades until the hook member engages, and is then retained in place by a front attachment disc which is fastened over the fronts of all the annulus fillers located around the rotor disc.

A problem can arise, however, when the retention grooves for the blades do not follow the same arc. For example, some blades have straight root portions that require correspondingly straight retention grooves. With such an arrangement, it can be difficult or impossible to navigate the hook member along the necessary arc without interference with the inner ends of the blades.

In other applications, the annulus fillers are joined to the disc using axial pins or trunnions. These features can tend to be heavy if designed to the required integrity.

In accordance with the present invention an annulus filler for mounting to a rotor disc of a gas turbine engine and for bridging the gap between two adjacent blades attached to the rotor disc, the annulus filler having an outer part which defines an airflow surface for air being drawn through the engine and a separate, support part which is connectable to the outer part and to the rotor disc to support the outer part on the rotor disc wherein the support part spaces the outer part from the rotor disc and has an inter-engaging portion that in use connects to the rotor disc and has a further inter-engaging portion that in use connects to the outer part.

The inter-engaging portion that connects to the rotor disc is substantially straight and in the preferred embodiment of the present invention is substantially parallel to the engine axis.

The inter-engaging portion that connects to the outer part is curved and in the preferred embodiment of the present invention is curved in an arc which matches a chordwise curvature of the adjacent blades.

Preferably the inter-engaging portions have dovetail sections and are located in filler slots having complimentary sections.

The inter-engaging portions may be slid into the filler slots so that the outer part is detachably connectable to the support part and the support part is detachably connectable to the rotor disk.

Preferably, the support part spaces the outer part from the rotor disc. For example, the support part may have a web portion to space apart the inter-engaging portions.

The filler slot of the rotor disc may have a blind rearward end to provide rearwards retention of the support part of the annulus filler. The further filler slot of the outer part may have a blind forward end to provide rearwards retention of the outer part of the annulus filler.

The annulus filler of the first or second aspect may have a locking system for preventing relative movement between the outer and support parts when the annulus filler is mounted to the rotor disc.

Preferably, the annulus filler of the first or second aspect is for bridging the gap between two adjacent fan blades.

Embodiments of the invention will now be described by way of example with reference to the accompanying drawings in which.

Figure 1:
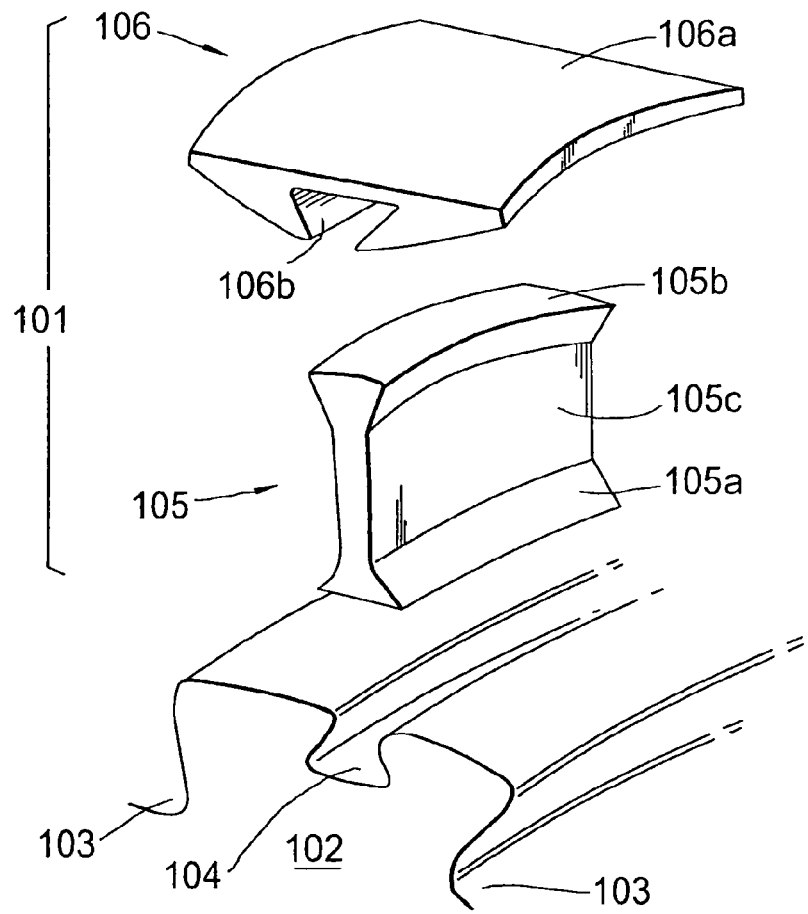
FIG. 1 shows a first embodiment of an annulus filler according to the present invention.

Referring to FIG. 1, there is shown a two-part annulus filler 101 and a portion of the radially outer surface of a compressor fan rotor disc 102.

The radially outer surface of the disc contains retention grooves 103 for retaining the root portions (not shown) of respective fan blades. The grooves are straight and extend in the axial direction of the engine.

The radially outer surface of the disc also contains, between respective pairs of neighbouring retention grooves, filler slots 104. The filler slots likewise are straight and extend in the axial direction of the engine parallel to the retention grooves.

One annulus filler is mounted at each filler slot to bridge the gap between neighbouring blades. Each annulus filler has a radially outer "lid" part 106, and a support "leg" part 105 which supports the lid on the rotor disc. As explained below, the two parts are detachably connectable. Although not shown, the lid has sealing members extending along its lateral edges for sealing the air gaps between the annulus filler and the adjacent blades.

To allow the leg 105 of an annulus filler to be mounted to the rotor disc, the radially inner portion 105a of the leg has a dovetail cross-section which corresponds to the cross-sectional-shape of the filler slot. The radially inner portion 105a can thus slide along the filler slot. Thus, the leg is connected to the rotor disc by sliding the leg along an insertion direction defined by the straight line of the filler slot. On insertion, the leg does not, therefore, interfere with the roots of the adjacent blades.

The leg further has a radially outer portion 105b, which is joined to the radially inner portion 105a by a web portion 105c. The radially outer portion 105b, which also has a dovetail cross-section, allows the lid 106 of the annulus filler to be connected to the leg. The overall cross-sectional shape of the leg is a "dog bone". The web portion spaces the lid from the outer surface of the rotor disc.

The lid 106 has a radially outer surface 106a, which defines an airflow surface for air being drawn through the engine between the adjacent blades, and a radially inner filler slot 106b, which has a cross-sectional shape corresponding to the dovetail cross-section of the radially outer portion 105b of the leg. Thus the filler slot 106b can slide along radially outer portion 105b, and the lid is connected to the leg by sliding the lid along an insertion direction defined by the line of the filler slot 106b. In their longitudinal directions, filler slot 106b and radially outer portion 105b follow arced paths that mirror the chord-wise curvatures of the aerofoil surfaces of the adjacent blades. Thus the lid has a curved insertion line that allows the lid to be inserted into the curved space between the blades.

To dismount the annulus filler, the mounting procedure is reversed. The lid is slid off the leg in the reverse direction along its arc-shaped insertion line, and the leg is then slid off the rotor disc in the reverse direction along its straight insertion line.

Although not shown, the filler slot 104 may have a blind rear end to provide rearwards retention of the leg 105. Additionally or alternatively, the filler slot 106b may have a blind front end to provide rearwards retention of the lid 106. Axial retention of the annulus filler in the forward direction may be by a thrust ring or the like.

Also not shown, the lid and leg may be fixed together by a secondary locking system (based on e.g. bolts, pins or hooks) to prevent relative movement of the lid and leg in use.

The leg and the lid can be formed from a variety of different materials depending on the application and service conditions. Possible materials include moulded polymer, fibre-reinforced polymer (e.g. glass, carbon, aramid or polyurethane fibres in a thermosetting or thermoplastic polymer matrix), machined metal, extruded metal and cast metal. Fibre-reinforced polymer parts can be formed, for example, using prepregs, compression moulding, injection moulding, resin transfer moulding, or resin transfer moulding with a 3D woven preform. Typical metals are aluminium, titanium or magnesium alloys.

In other embodiments of the invention, the lid may be connected to the leg using engagement features other than the filler slot in the lid and the corresponding dovetail section portion in the leg.

For example, the lid may be connected to the leg using e.g. engaging lugs, hooks, bolts or pins. These methods of attachment can preserve the advantages of a two-part annulus filler, but may facilitate the replacement of parts of the filler most likely to see wear or degradation, such as the lid and seal members. In particular, alternative engagement features can allow the lid to be connected to leg with a predominantly radial motion, rather than along an arced insertion line in a chord-wise direction.

Insertion with a predominantly radial motion can be advantageous if insertion in a chord-wise direction would lead to significant frictional resistance from the sliding of the seal members on the lateral edges of the lid against the surfaces of the blades. Because the gap between adjacent blades is greater with increasing radial distance, insertion of the lid in a predominantly radial direction may only meet significant frictional resistance from the sealing members' contact with the blades when the lid is at or close to its final position.

Second, third, fourth and fifth embodiments of an annulus filler according to the invention are described below. These embodiments allow insertion of the lid with a predominantly radial motion. However, the third, fourth and fifth embodiments also require a short chord-wise motion to complete the connection between the lid with the leg.

Figure 2A:
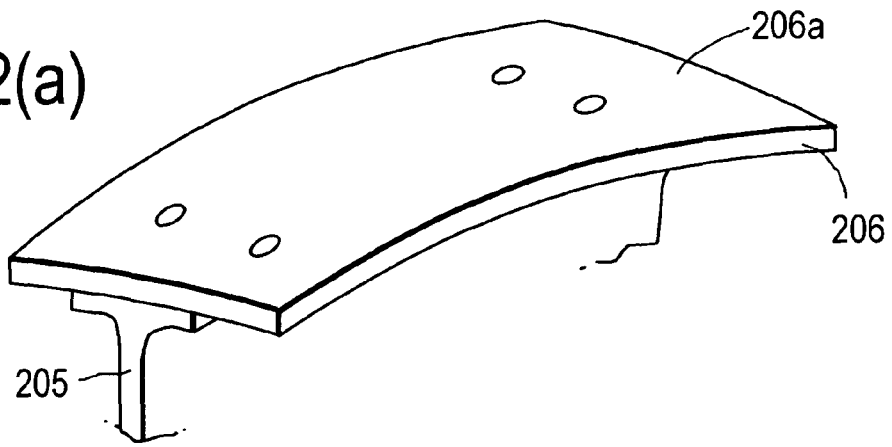
FIG. 2a shows a radially outer view of a second embodiment of an annulus filler according to the invention.
Figure 2B:
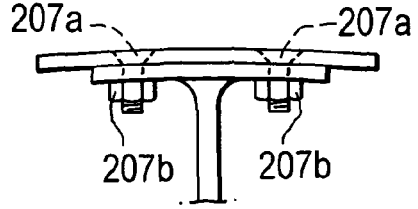
FIG. 2b shows a transverse cross-section through the filler.

FIG. 2a shows the airflow surface 206a of lid 206 of a second embodiment of an annulus filler according to the invention. FIG. 2b shows a transverse cross-section through the lid 206 and the radially outer half of leg 205.

Bolts 207a and nuts 207b hold the lid to the leg. The heads of the bolts are countersunk in the airflow surface 206a to minimise disruption to the airflow.

Figure 2C:
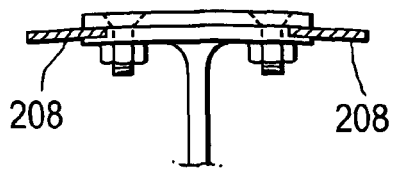
FIG. 2c shows a transverse cross-section through a variant of the filler.

In a variant of this embodiment, the seal members 208 can be trapped between the lid and the leg, as shown in FIG. 2c. This facilitates the replacement of the seal members relative to arrangements in which the seal members are adhesively bonded to the annulus filler.

Figure 3A:
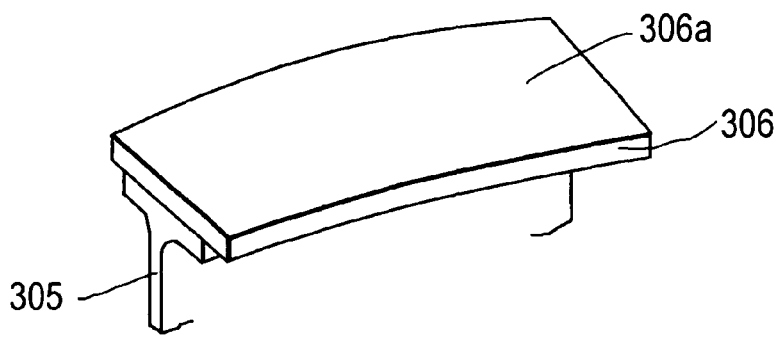
FIG. 3a shows a radially outer view of a third embodiment of an annulus filler according to the invention.
Figure 3:
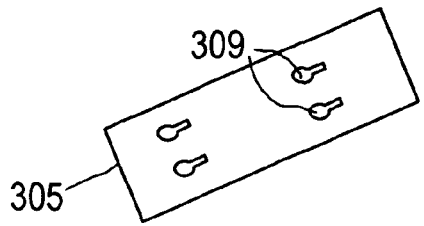
FIG. 3b shows the radially outer surface of the support part of the filler.
FIG. 3c shows a longitudinal cross-section through the filler.
Figure 3C:
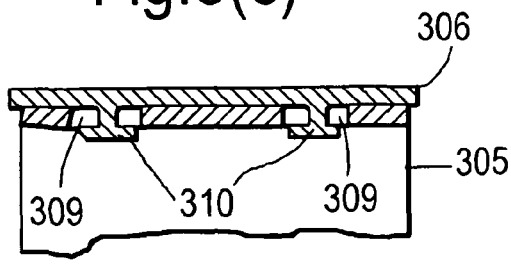

FIG. 3a shows the airflow surface 306a of lid 306 of a third embodiment of an annulus filler according to the invention. As shown in FIG. 3b, which is a view of the radially outer surface of leg 305, key-hole slots 309 are formed in the radially outer portion of the leg. FIG. 3c is a longitudinal cross-section through the lid 306 and the radially outer half of leg 305, and shows lugs 310 projecting from the radially inner surface of the lid and engaging with the key-hole slots.

Figure 4:
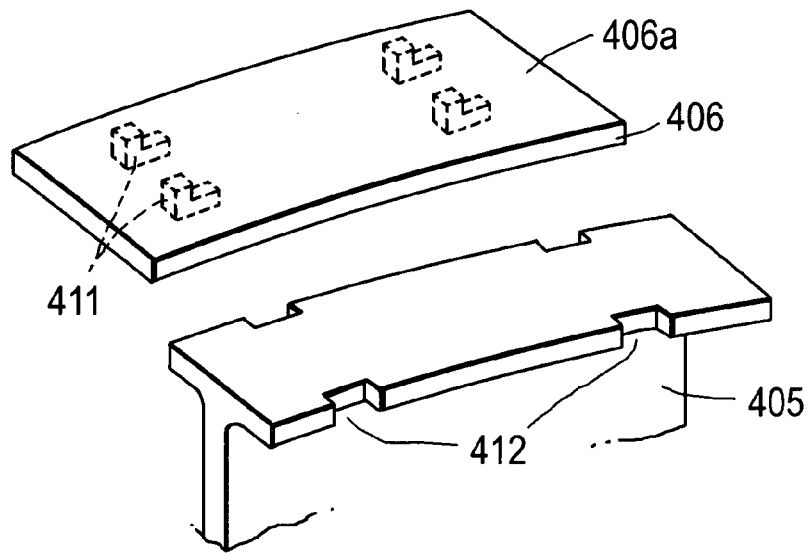
FIG. 4 shows a fourth embodiment of an annulus filler according to the invention.

FIG. 4 shows the airflow surface 406a of lid 406 and the radially outer part of leg 405 of a fourth embodiment of an annulus filler according to the invention. Hooks 411 on the radially inner side of the lid engage with slots 412 in the lid.

Figure 5:
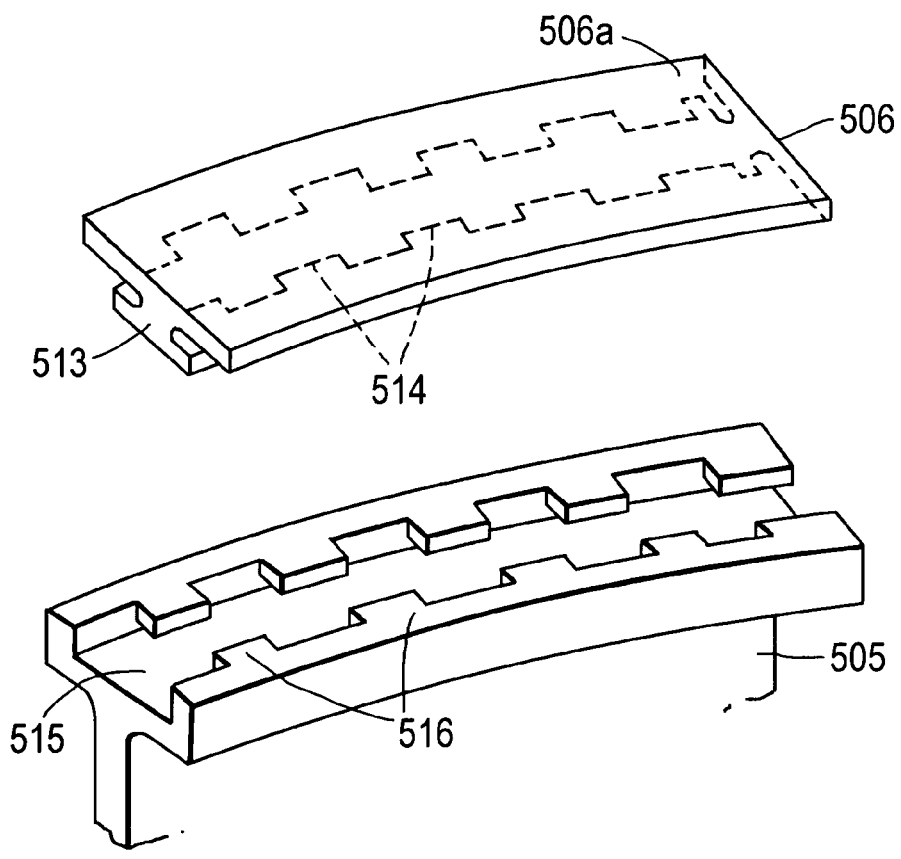
FIG. 5 shows a fifth embodiment of an annulus filler according to the invention.

FIG. 5 shows the airflow surface 506a of lid 506 and the radially outer part of leg 505 of a fifth embodiment of an annulus filler according to the invention. A longitudinally extending rib 513 with a series of spaced slots 514 at each lateral side thereof is formed on the radially inner side of the lid. The radially outer part of leg 505 has a longitudinal slot 515 with a series of spaced over-hanging lugs 516 at each lateral side thereof. The slots 514 pass between the lugs on radial motion of the lid, and then, on a short chord-wise movement of the lid, the projections between the slots slide underneath the lugs 515 to connect the lid to the leg.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. An annulus filler for mounting to a rotor disc of a gas turbine engine and for bridging the gap between two adjacent blades attached to the rotor disc,
    wherein the annulus filler having an outer part which defines an airflow surface for air being drawn through the engine and a separate support part which is connectable to the outer part and to the rotor disc to support the outer part on the rotor disc,
    wherein the support part spaces the outer part from the rotor disc and has an inter-engaging portion that in use connects to the rotor disc and has a further inter-engaging portion that in use connects to the outer part, and
    wherein the inter-engaging portion that connects to the outer part is curved in an arc which matches a chordwise curvature of the adjacent blades.

2. An annulus filler as claimed in claim 1 in which the inter-engaging portion that connects to the rotor disc is substantially straight.

3. An annulus filler as claimed in claim 1 in which the inter-engaging portion that connects to the rotor disc is substantially parallel to the engine axis.

4. An annulus filler as claimed in claim 1 in which the inter-engaging portions have dovetail sections which are located in filler slots having complementary sections.

5. An annulus filler as claimed in claim 4 in which the filler slot in the rotor disc is substantially straight.

6. An annulus filler as claimed in claim 4 in which the filler slot in the outer part is arc-shaped.

7. An annulus filler as claimed in claim 1 in which the inter-engaging portions are slid into filler slots having complimentary sections.

8. An annulus filler as claimed in claim 1, in which the support part has a web portion to space apart the inter-engaging portions.

9. An annulus filler as claimed in claim 1, which has a locking system for preventing relative movement between the outer and support parts when the annulus filler is mounted to the rotor disc.

* * * * *